United States Patent [19]

Burke

[11] Patent Number: 5,300,957
[45] Date of Patent: Apr. 5, 1994

[54] METHOD AND APPARATUS FOR HIGH-SPEED INTERLACED PRINTING IN THE DIRECTION OF PRINT HEAD SCANNING

[75] Inventor: Edward F. Burke, Lake Oswego, Oreg.

[73] Assignee: Tektronix, Inc., Wilsonville, Oreg.

[21] Appl. No.: 836,172

[22] Filed: Feb. 12, 1992

Related U.S. Application Data

[63] Continuation of Ser. No. 649,635, Feb. 1, 1991, abandoned.

[51] Int. Cl.$^5$ .............................. B41J 2/01
[52] U.S. Cl. ..................... 346/1.1; 346/140 R
[58] Field of Search ............ 346/140 R, 1.1, 75, 346/76 PH; 358/296

[56] References Cited

U.S. PATENT DOCUMENTS

| | | | |
|---|---|---|---|
| 4,112,469 | 9/1978 | Paranjpe et al. | 358/296 |
| 4,232,324 | 11/1980 | Tsao | 346/75 |
| 4,401,991 | 8/1983 | Martin | 346/75 |
| 4,596,990 | 6/1986 | Hou | 346/75 |
| 4,748,453 | 5/1988 | Lin et al. | 346/1.1 |
| 4,864,328 | 9/1989 | Fischbeck | 346/140 R |
| 4,965,593 | 10/1990 | Hickman | 346/140 R |
| 4,967,203 | 10/1990 | Doan et al. | 346/1.1 |

Primary Examiner—Benjamin R. Fuller
Assistant Examiner—N. Le
Attorney, Agent, or Firm—Edward B. Anderson; Ralph D'Alessandro; John D. Winkelman

[57] ABSTRACT

A cylindrical drum is rotatable about a drum axis for supporting a print medium during printing. A print head has a plurality of printing elements for printing image elements of a predetermined color at a predetermined image-element printing rate. The drum is rotated about the drum axis at a predetermined speed such that alternate image-element locations are addressed by each printing element during each rotation of the drum at the predetermined printing rate. The drum rotates two revolutions at each print-head location along the axis, and all image-element locations are addressed.

7 Claims, 1 Drawing Sheet

METHOD AND APPARATUS FOR HIGH-SPEED INTERLACED PRINTING IN THE DIRECTION OF PRINT HEAD SCANNING

This is a continuation of application of Ser. No. 07/649,635 filed Feb. 1, 1991 and now abandoned.

FIELD OF THE INVENTION

This invention relates to interlaced printing of a dot-matrix image in a scanning direction at a speed corresponding to a maximum print rate.

BACKGROUND OF THE INVENTION

There are many forms of printers for printing a dot-matrix image on a print medium, which most typically is a sheet of paper or transparent film. Two of these involve the use of a rotating drum that supports the print medium. A print head is moved along the surface of the drum parallel to the axis of rotation of the drum. As used herein, the term "X-axis motion" refers to movement of the print head in a direction parallel to the drum's axis of rotation, which conventionally is horizontal. "Y-axis motion" refers to movement in the direction of rotation of the drum, and thus corresponds to movement of the print head around the circumference of the drum.

In both of these forms of printers, the print head advances in one direction slowly, usually in increments, while scanning rapidly in the other direction. As used herein, "direction" refers to motion in either direction along a line. The direction in which the print head advances slowly is referred to herein as the advance direction. The direction in which the print head scans rapidly is referred to as the scan direction. Scanning takes place typically by either reciprocating (shuttling) the print head in X-axis motion, or by rotating the drum rapidly resulting in relative print head Y-axis motion.

The preferred method and embodiment for practicing the present invention is particularly directed to a hot-melt ink jet printer wherein a print head advances in increments in X-axis motion which is therefore the advance direction, while a sheet of paper or film is held against a rotating drum. Images are formed by selectively and serially depositing ink drops of primary or base colors at uniformly spaced address locations to form a dot-matrix image. The present invention however is also applicable to any printing process wherein a print head travels along the scan axis relative to a print medium to form a desired final graphic or textual image formed of spaced dots or image elements.

An example of a printer with a reciprocating print head is disclosed in U.S. Pat. No. 4,864,328 issued to Fischbeck. That printer advances the print medium at one speed for low-quality printing and at a lower speed for high-quality printing. Since adjacent, pixels are printed in both the advance and scan directions, ink drops are deposited at a maximum rate, but no interlacing of the ink drops is achieved.

Print heads are also known that contain an array of nozzles that are spaced and of a predetermined number to provide interlaced printing with each image element being addressed once by only one nozzle. Such a technique for a single color is described by Paranjpe et al. in U.S. Pat. No. 4,112,469. In column 7 of that patent, a formula is provided for determining the spacing and number of nozzles that may be used to provide interlaced printing in the advance direction. Variations in the layout of nozzle arrays that achieve such interlaced printing are also illustrated in U.S. Pat. No. 4,232,324 issued to Tsao.

In each of such printing devices, the interlacing is in the advance direction only, with image rows or columns being printed successively. This means that every printed pixel or image-element location aligned with a print orifice during a scan must have an ink drop deposited on it during that scan. Adjacent pixels are therefore printed at close to the same time. For some inks, such as aqueous and hot-melt inks, there is a mixing of the adjacent ink drops. Mixing of aqueous inks does not result in a different appearance, particularly if they are the same color.

However, if dots of hot-melt ink that have not solidified are deposited adjacent to or on top of one another, they mix. When they mix, the resultant color is different than it is if the first dot solidifies before the second dot is deposited. Part of the reason for this is that the hot-melt ink has a surface texture that is different when the adjacent ink drops mix, resulting in a different optical appearance.

One printing pattern that avoids printing adjacent pixels during a single scan is the color ink jet printer sold under the proprietary name PaintJet XL by Hewlett Packard. This printer prints a checkerboard pattern on each pass of the print head over a print medium, by printing only alternate pixel locations in both directions. The print medium is then shifted and a checkerboard pattern offset from the previous pattern is printed so that all pixel locations in the overlapped region are addressed in two passes.

If this technique is applied to hot-melt ink printers, the mixing between dots is substantially avoided. However, this and other conventional printers use the individual printing elements or nozzles at less than their maximum efficiency. The Hewlett Packard system requires two sets of nozzles to fully address all the pixel locations. One set prints while the carriage scans in a positive direction, and the other set prints while it moves in the negative direction. Such interlaced printing provides a high quality image but results in substantial underutilization of the print head compared to what continuous printing by the same number of nozzles could theoretically provide.

SUMMARY OF THE INVENTION

The present invention provides a method and an apparatus that provides interlaced printing in the scan direction and maximum use of each nozzle based on a predetermined maximum or full pixel-printing rate. That is, each nozzle addresses sequentially, at its full printing rate, spaced-apart pixel locations.

Generally, the method of the present invention includes the step of addressing a first set of spaced-apart pixel locations aligned in the scan direction during a first pass of a print orifice at the full printing rate. During a second pass, the orifice then addresses pixel locations that were not adjacent in the previous scan, also at the full printing rate. Thus, if odd-numbered pixel locations are addressed during the first scan and the even-numbered locations addressed during second scan, all pixel locations aligned with the orifice in the scan direction are addressed. During each pass, selected pixel locations are printed as they are addressed.

In the preferred printer of the invention a drum driver rotates the drum about a drum axis at a predetermined speed such that only every-other pixel location is addressed by each orifice during each rotation of the drum at the full printing rate. The speed of rotation of the drum is set so that the surface speed is twice the "normal" surface speed. The "normal" surface speed is calculated by the following equation:

$$V_N = \text{drop rate/addressability},$$

where the drop rate is the maximum rate of ink dropping, drops/sec., and the addressability is the linear pixel density, drops/inch.

The drum rotates two revolutions at each incremental print-head location in the advance direction. A controller coupled to the print head and the print-head driver selectively prints pixels at the addressed pixel locations. The head then moves in the advance direction to the next location and the cycle repeats.

A printer and method are thus provided by the invention that results in interlacing in the scan direction at a speed of printing that is equivalent to the rate that the same number of orifices could print if each one printed consecutive pixels. The present invention thus provides interlacing along the scan axis without a speed penalty.

These and other features and advantages of the present invention will become apparent from a reading of the following detailed description of the preferred embodiment and method for practicing the present invention when read with reference to the associated drawings.

DETAILED DESCRIPTION OF THE PREFERRED EMBODIMENT

Figure 1:
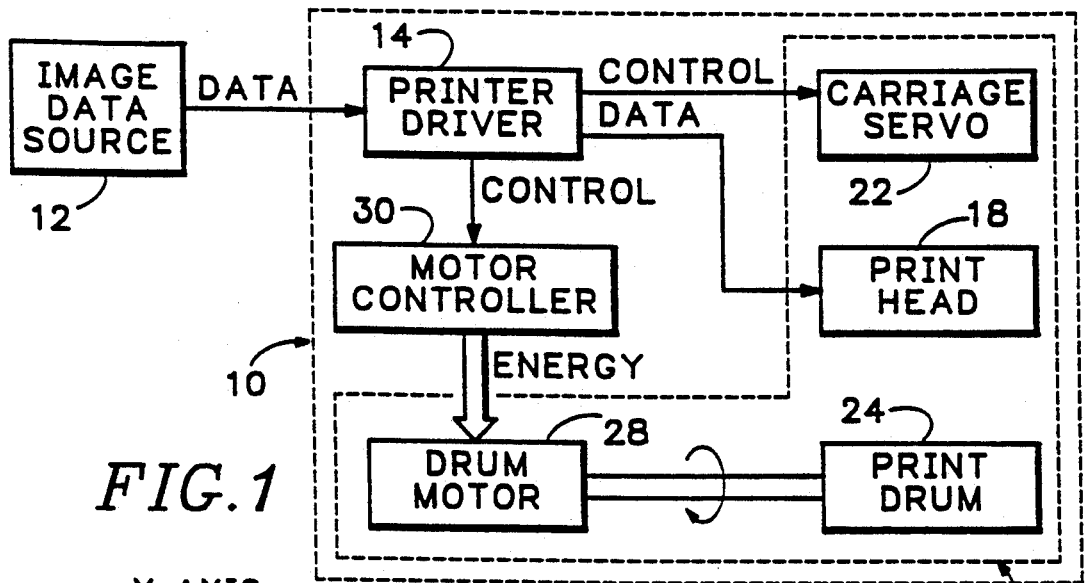
FIG. 1 is a general block diagram illustrating a printer made according to the invention.

Referring initially to FIG. 1, a serial, print-on-demand dot-matrix printer 10 made according to the present invention is shown. Printer 10 receives scan data from a data source 12. This data defines the colors to be printed at each pixel location on a predetermined image area of a print medium.

The data is fed into a printer driver 14 that controls operation of print engine 16. Control includes feeding formatted data to a print head 18, the movement of which is provided by a carriage 20, shown in FIG. 2, controlled by a carriage servo 22. Rotation of a print drum 24 about an axis 25, that carries a print medium 26, such as a sheet of paper or transparency, is provided by a motor 28. The motor is controlled by a motor controller 30 receiving control data from printer driver 14.

Figure 2:
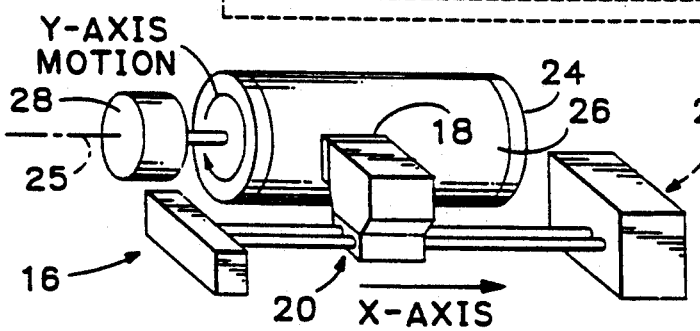
FIG. 2 is a perspective view of an exemplary print head and associated drum of the printer of FIG. 1.

FIG. 2 is a simplified perspective view of the drum, drum motor, print head, and carriage of printer 10. Carriage 20 is preferably driven by a cable drive or other suitable linear drive system that moves the print head from one side of the print medium to the other while the drum rotates.

Figure 3:
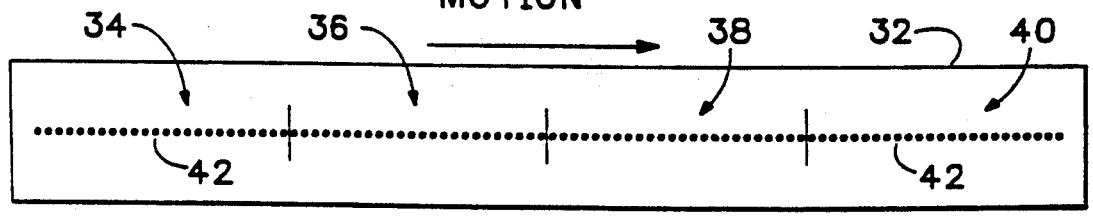
FIG. 3 is an enlarged face view of the nozzle array of the print head of FIG. 2.

FIG. 3 illustrates a face 32 of the print head having linear sets 34, 36, 38 and 40 of nozzles identified by orifices 42 for each of the four basic colors of black, cyan, yellow and magenta, respectively. Each set of nozzles includes 24 orifices having centers spaced the width of seven pixels.

In order to achieve interlacing in the advance direction resulting from X-axis motion, the nozzle array of FIG. 3 or other equivalent array can be used. However, rather than duplicate the number of nozzles, and thereby increase the cost and complexity of the print head, interlacing in the scan direction resulting from Y-axis motion by a single nozzle is achieved by printing only alternate pixel locations during each rotation of the drum. By rotating the drum two complete revolutions for each incremental position of the print head relative to the drum, all the pixel locations in each column are addressed. If hot melt ink is used, each pixel printed during the first rotation thereby has time to solidify before an adjacent pixel is printed.

The drum is rotated at twice the speed required to address all pixel locations during a single rotation. For instance, for a printing rate of 8000 pixels per second at an addressability of 300 pixels per inch, $V_N=26.66$ in/sec. An ordinary printer not using the present invention and having a drum diameter of 12.5 inches would spin that drum at 2.133 revolutions per second. Using this invention, the drum would rotate at 4.266 revolutions per second, but each print jet would produce ink droplets at a maximum 8000 pixels per second rate. There is thus no time penalty obtained by double scanning the print medium for each position of the print head in the advance direction.

Figure 4:
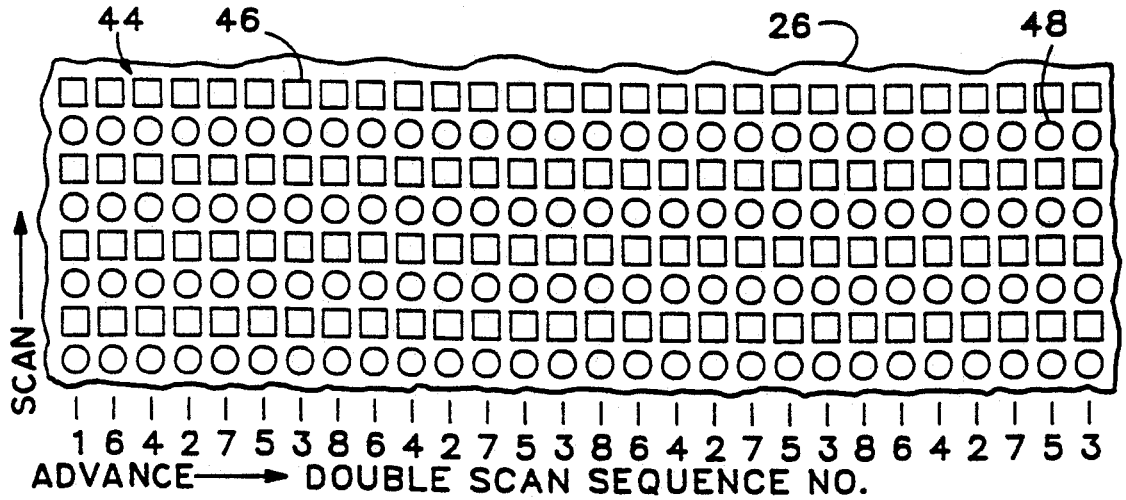
FIG. 4 is an illustration of the printing method of the printer of FIG. 1.

FIG. 4 illustrates the method of practicing the present invention using one of the sets of the nozzle array of FIG. 3. The vertical columns, identified by the numbers 1, 6, 4, 2, 7, 5, 3, 8 . . . at the bottom of the columns, represent portions of an image area 44 of a medium 26 supported on the drum. Pixel locations are identified by squares 46 and circles 48. The squares represent even-numbered pixel locations and the circles represent odd-numbered pixel locations.

When the print head is in an initial print position for the image area shown, i.e., the position identified by the number 1 at the bottom of the left-most column, only one nozzle is aligned for printing in the image area. During the first rotation of the drum, the even-numbered pixel locations 46 are addressed, by that nozzle, and if appropriate for the image, printed. During the second rotation, the odd-numbered pixel locations 48 are addressed and printed.

The print head is then moved to the right in the advance direction by a distance equal to the width of twenty-four pixels to a second position. The columns aligned with orifices in this position are identified by the number 2. In the figure, there are four nozzles 42 aligned for addressing and printing the alternate pixel locations in these columns. The two sets of alternating pixel locations are then addressed and printed, as was done for the column having the sequence number 1, just described.

By successively moving the print head to new positions, as represented by the sequential numbers 3, 4, 5 . . . in the advance direction, the entire image area is addressed, with each nozzle addressing pixel elements in alternate rows during each of two rotations or scans of the drum relative to the print head at each position. (It will be appreciated that sequence number 8 corresponds to initial position 1, since the print head orifices are spaced seven pixels apart.) By rotating the drum at a speed appropriate for addressing alternate pixel locations within each column at the maximum print rate, such as 8 kHz in the above example, each nozzle is printing at its maximum rate. This provides the optimum efficiency of use of the nozzles while providing interlacing of pixel locations along the Y-axis.

Other variations of the invention are also possible. For instance, the printer could be of a form different than the preferred printer, as was earlier discussed. Further, the drum could be made to rotate at three (or more) times the "normal" speed, with the orifices then addressing every third (or more) pixel at the maximum printing rate. It will therefore be appreciated that variations in form and detail may be made in the embodiment described without varying from the spirit and scope of the invention as defined in the claims.

I claim:

1. A method for interlaced ink jet printing of an image composed of a plurality of pixels disposed at selected pixel locations in an advance direction and a scan direction over a surface of a print medium, using an ink jet print head having an ink jet printing individual pixels at a predetermined printing rate, comprising the steps of:
   (a) positioning the print head at a selected location along the advance direction;
   (b) moving the print medium relative to the print head in the scan direction to pass pixel locations distributed along the advance direction past the print head;
   (c) while maintaining the print head at the selected location, printing at the predetermined printing rate a first set of pixels alternating in at least the scan direction during a first pass of the print medium past the print head;
   (d) subsequently printing at the predetermined printing rate a second set of pixels alternating in at least the scan direction during a second pass of the print medium past the print head while maintaining the print head at the selected location;
   (e) repositioning the print head to another selected location along the advance direction; and
   (f) repeating steps (c) and (d);
   (g) repositioning the print head to additional locations along the advance direction; and
   (h) repeating steps (c) and (d) at each of the additional locations.

2. The method of claim 1, wherein the print head includes a plurality of ink jets, each of the plurality of ink jets printing individual pixels at the predetermined printing rate, the jets being arrayed in a direction corresponding to the advance direction, and wherein steps (c) and (d) include simultaneously printing a plurality of pixels located in the advance direction.

3. The method of claim 2, wherein the ink jet head includes multiple groups of ink jets, with the ink jets in each of the multiple groups being arrayed in a direction corresponding to the advance direction, and with the ink jets of each of the multiple groups depositing a different color ink than the ink jets of each other of the groups.

4. The method of claim 3, wherein the ink jets in each of the multiple groups are aligned with those of the ink jets in each other of the groups.

5. The method of claim 1, wherein the print medium is supported on a rotating drum for movement in a direction corresponding to the scan direction, and in performing steps (c) and (d), the drum is rotated about an axis parallel to the advance direction at least two consecutive revolutions at each print head location along the advance direction, the drum having a speed of rotation being at a whole number multiple of a normal surface speed such that each of the sets of pixels alternating in at least the scan direction is printed during each rotation of the drum, and such that the image is effectively printed at the normal surface speed.

6. The method of claim 5, wherein in performing steps (c) and (d), the speed of rotation is twice the normal surface speed.

7. The method of claim 1, wherein said ink jet print head prints the pixels using hot melt ink, and wherein the second set of pixels alternating in at least the scan direction are printed after the first set of pixels alternating in at least the scan direction has a time sufficient for the hot melt ink to solidify.

* * * * *